(12) United States Patent
Chen

(10) Patent No.: US 7,804,252 B2
(45) Date of Patent: Sep. 28, 2010

(54) TWO WAY LIGHTING CONTROL SYSTEM WITH DUAL ILLUMINATION SOURCES

(76) Inventor: Chia-Teh Chen, 5F, No. 30, Yisian Rd., Taipei City (TW)

( * ) Notice: Subject to any disclaimer, the term of this patent is extended or adjusted under 35 U.S.C. 154(b) by 202 days.

(21) Appl. No.: 12/213,607

(22) Filed: Jun. 23, 2008

(65) Prior Publication Data
US 2009/0251058 A1 Oct. 8, 2009

(30) Foreign Application Priority Data
Apr. 2, 2008 (CN) .................... 2008 2 0107140 U

(51) Int. Cl.
*H05B 37/00* (2006.01)
(52) U.S. Cl. .................. 315/152; 315/155; 315/158
(58) Field of Classification Search ............... 362/362, 362/372, 800, 257, 276, 277, 228, 234, 235; 315/149, 152, 153, 155, 158
See application file for complete search history.

(56) References Cited
U.S. PATENT DOCUMENTS
5,747,937 A 5/1998 Wiesemann et al.
6,078,257 A * 6/2000 Ferraro .................... 340/568.1
6,371,629 B1 * 4/2002 Martinez .................... 362/363
2010/0039792 A1 * 2/2010 Meyers et al. ................. 362/20

* cited by examiner

*Primary Examiner*—David Hung Vu
(74) *Attorney, Agent, or Firm*—Rosenberg, Klein & Lee

(57) ABSTRACT

A two way lighting control system with dual illumination sources, including a lighting unit, a photocell, a motion sensor, and at least one light source base. The lighting unit includes two light source loads. The high wattage light source load is the first light source, and the low wattage source load is the second light source. The illumination of the first light source load is greater than the illumination of the second light source load. The first light source load is electrically connected with the motion sensor via the base, and then is further electrically connected with the photocell to form the first circuit loop. The second light source load is electrically connected with the photocell via the base to form the second circuit loop. Thereby, the present invention can satisfy consumers' requirements of providing both high illumination light and low illumination light with energy saving benefit as needed.

8 Claims, 15 Drawing Sheets

TWO WAY LIGHTING CONTROL SYSTEM WITH DUAL ILLUMINATION SOURCES

BACKGROUND OF THE INVENTION

1. Field of the Invention

The present invention relates to a two way lighting control system with dual illumination sources. In particular, this invention relates to a lighting technology which can change the level of illumination via the performance of a passive infrared motion sensor and a photo cell control circuit.

2. Description of the Related Art

The two level lighting system of the present invention has a similar function as the prior art U.S. Pat. No. 5,747,937/Two Level Security Lighting System. However, the technology employed in the present invention is different from such prior art and is characterized with two significant merits; First, the present invention avoids the employment of a dimmer circuit (such as triac circuit) to achieve the function of two level illumination resulting into a lower manufacturing cost which helps to save consumers' initial spending. Second, because of no employment of dimmer circuit the present invention does not consume additional electric power for driving the dimmer performance. The energy efficiency of the present invention is therefore superior to such prior art. It helps consumers to save significant amount of energy expense over time. According to experiments the power efficiency of the present invention is as high as 95.7% while the power efficiency of such prior art is only 59% which means vast amount of power is used for the operation of dimmer circuit in the performance of such prior art.

The prior art uses the triac technology to generate two levels of illumination with a single illumination source light bulb; At dusk, the photo cell turns the power supply on and the control system manages the light bulb to illuminate at low level. When a living creature enters the detection area of the passive infrared motion detector, the control system immediately manages the light bulb to illuminate at high level and continues such high level illumination till the living creature leaves the detection area, then the system manages the light bulb to resume low level illumination in a short period of time. At dawn the photo cell turns off the power supply causing the low level illumination to cease during day time.

The present invention, being different from the above prior art which adopts a single bulb structure, uses two light sources structure to achieve similar function. One light source has a higher wattage load while the other light source has lower wattage load. The higher wattage light source is electrically connected to the passive infrared motion detector and then further connected to the photo cell. The lower wattage light source is directly connected to the same photo cell. At dusk, the photo cell turns on the power supply and the low level light source immediately turns on. The system therefore demonstrates a low level illumination. When a living creature enters the detection area of the passive infrared motion detector, the motion sensor instantly turns on the high wattage light source and the system then demonstrates dual illuminations simultaneously till the living creature leaves the detection area at which time the high wattage light source cease to illuminate in a short period of time. The system then resumes to low level illumination by the low wattage light source. At dawn the photo cell turns off the power supply causing the low wattage light source to cease illumination.

SUMMARY OF THE INVENTION

The purpose of the present invention is to provide an automatic lighting control system with two level illumination capacity; when the motion of living creatures occurs outside of the detection range of the motion sensor, the lighting system provides an energy saving low level illumination and when motion of living creatures occurs within the detection area the lighting system instantly turns on the high level light source to provide full illumination with two light sources. Thus the present invention is capable of satisfying both the need of energy saving outside of the detection area for indicative illumination and the need of full illumination within the detection area as required.

The present invention adopts a lighting structure with two illumination sources; one is equipped with high wattage load and the other is equipped with low wattage load. The two illumination sources can be composed with the same materials or with different materials. If the two illumination sources are made with same materials, they can be built and integrated in a common bulb shell to form a composite bulb, such as the three way bulbs which are popularly used for desk lamps or floor lamps. The illumination materials can be tungsten filament, fluorescent, inert gases such as halogen or xenon, or light emitting diodes (LED). No matter whether the two light sources are integrated in a bulb or separately constructed, each of the two light sources has its own independent electric circuit loop to perform different level of illumination. This technology is totally different from the prior art that uses only one light source to generate two levels of illumination.

The low wattage load is directly connected in series with the photo cell to form a circuit loop. The high wattage load is electrically connected with the PIR (passive infrared motion sensor) in series and then is electrically coupled with the photo cell in series to form another circuit loop.

When night time comes, the photo cell activates the power supply to turn on the low level (low wattage) light source and meantime to set the high level (high wattage) light source and the PIR (motion sensor) in the stand by mode. If no motion is detected within the detection range of the PIR the lighting system continues its low level illumination. When a human being or an animal enters the detection range of the PIR the system then instantly turns on the high level light source and continues both low level and high level illuminations until the human being or the animal leaves (judged by the lack of motion after a short period of time). Thereby the goals of both providing a suitable illumination (low level or high level as needed) and saving energy are achieved.

The present invention does not limit the kinds of light sources; they can be incandescent bulbs (such as tungsten bulbs, halogen bulbs or xenon bulbs), or fluorescent bulbs or LED bulbs. The set of two light sources can be a combination of two loads with same material construction (such as a set of two tungsten filaments, a set of two fluorescent elements or a set of two LED units) or a combination of two loads with different material construction (such as tungsten bulb with LED unit or fluorescent bulb with LED unit or xenon bulb with LED unit). The common characteristic is one light source is always equipped with higher wattage load than the other light source. For the combination of two light sources with different material construction the lower wattage light source is always a LED light.

For further understanding of the invention, reference is made to the following detailed description illustrating the embodiments and examples of the invention. The description is for illustrative purpose only and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
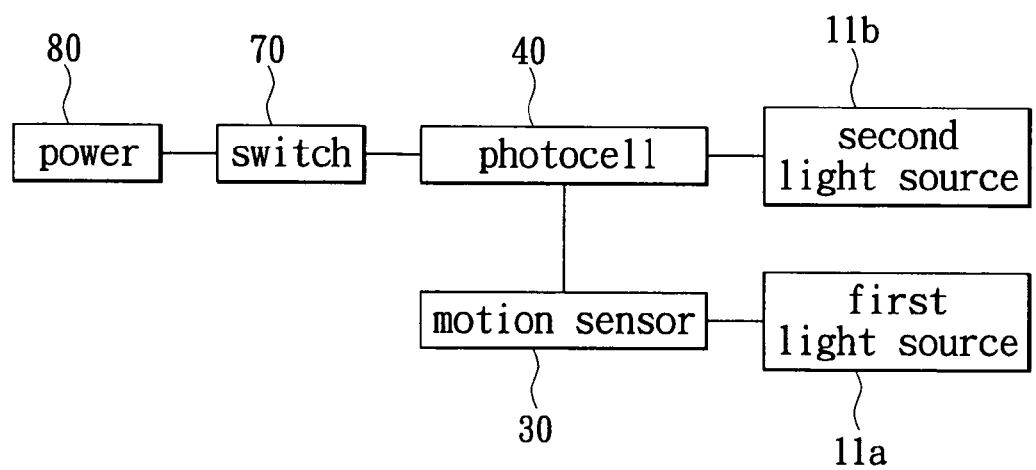
FIG. 1 is a block diagram of the system of the present invention.

Reference is made to FIG. 1, which shows block diagram of the system of the present invention. An external power supply 80 is electrically connected with a wall switch 70, which is further electrically connected with the photo cell 40, which is further divided into two circuits. One circuit is directly and electrically connected with the second light source 11b with a low wattage load. The other circuit is electrically connected with the motion sensor 30 and then electrically connected with the first light source 11a with a high wattage load.

The operation principle is illustrated as followings. When night time comes, the photo cell activates the power supply 80 to turn on the second light source 11b with a low wattage, and meantime the motion sensor 30 enters the stand by mode. When no person(s) or animal(s) enters the detection area of the motion sensor 30, the first light source 11a is off and only the second light source 11b with a low wattage illumination is turned on. However, when the motion sensor 30 detects that some person(s) or animal(s) enters the detection area of the motion sensor 30, the motion sensor 30 immediately conducts the circuit loop of the first light source 11a to turn on the first light source 11a with a high wattage illumination. At this time, both the first light source 11a and the second light source 11b are turned on to provide the brightest illumination (high illumination). When the person(s) or animal(s) leaves the detection area of the motion sensor 30 (which is judged by the lack of motion after a certain time period), the motion sensor 30 immediately cut off the circuit loop of the first light source 11a to turn off the first light source 11a and only the second light source with a low wattage illumination remains functioning (low illumination). When the daybreak comes, the photo cell 40 cuts off the power supply 80 to cease the illumination of the second light source 11b.

The first light source 11a and the second light source 11b can be constructed with same illuminating materials or with different illuminating materials. Regardless of the composition of the construction materials, the second light source 11b is always an energy saving light source with low illumination and low wattage consumption while the first light source 11a is always a high wattage light source with high illumination in the present invention.

Figure 2:
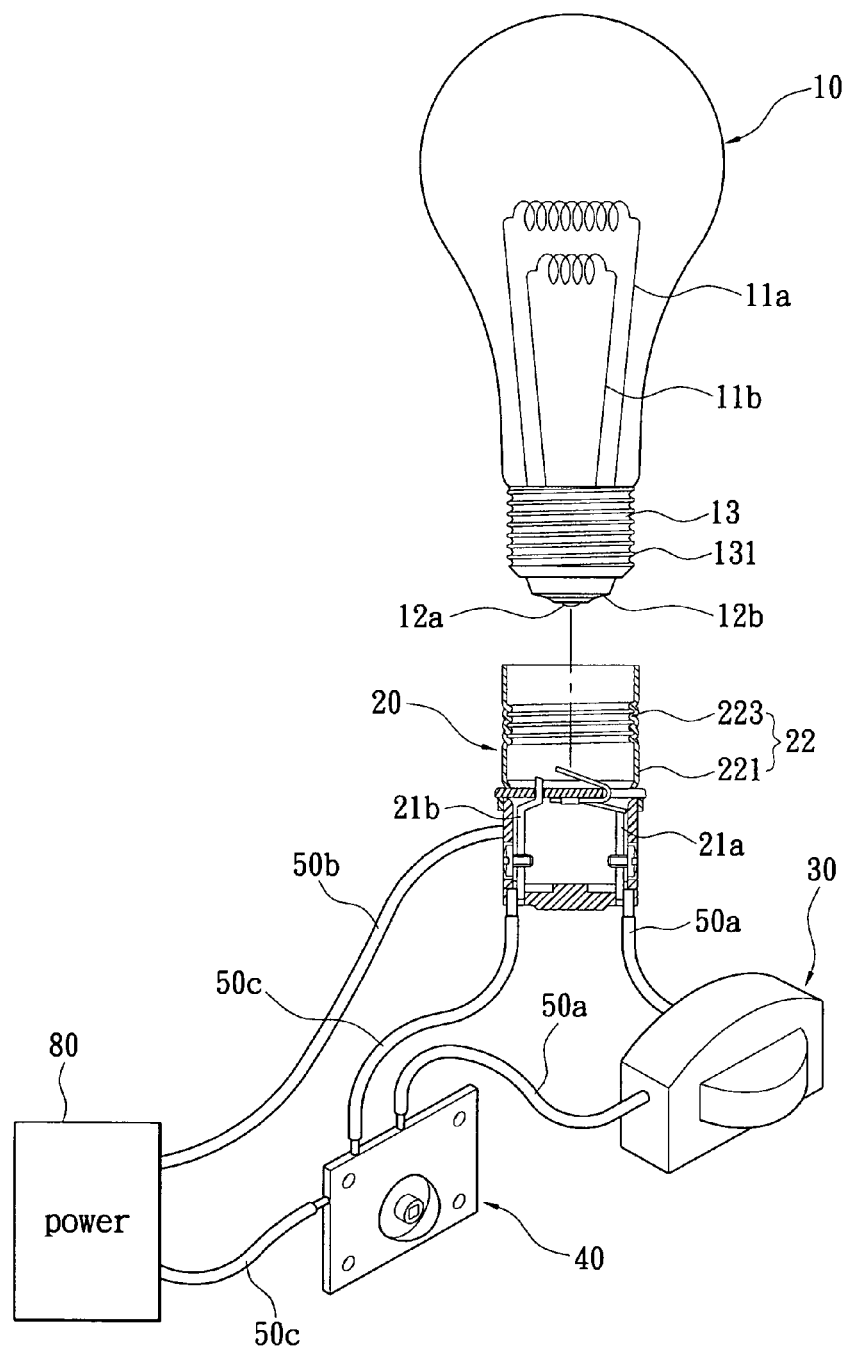
FIG. 2 is a schematic diagram of the first embodiment of the present invention.
Figure 2A:
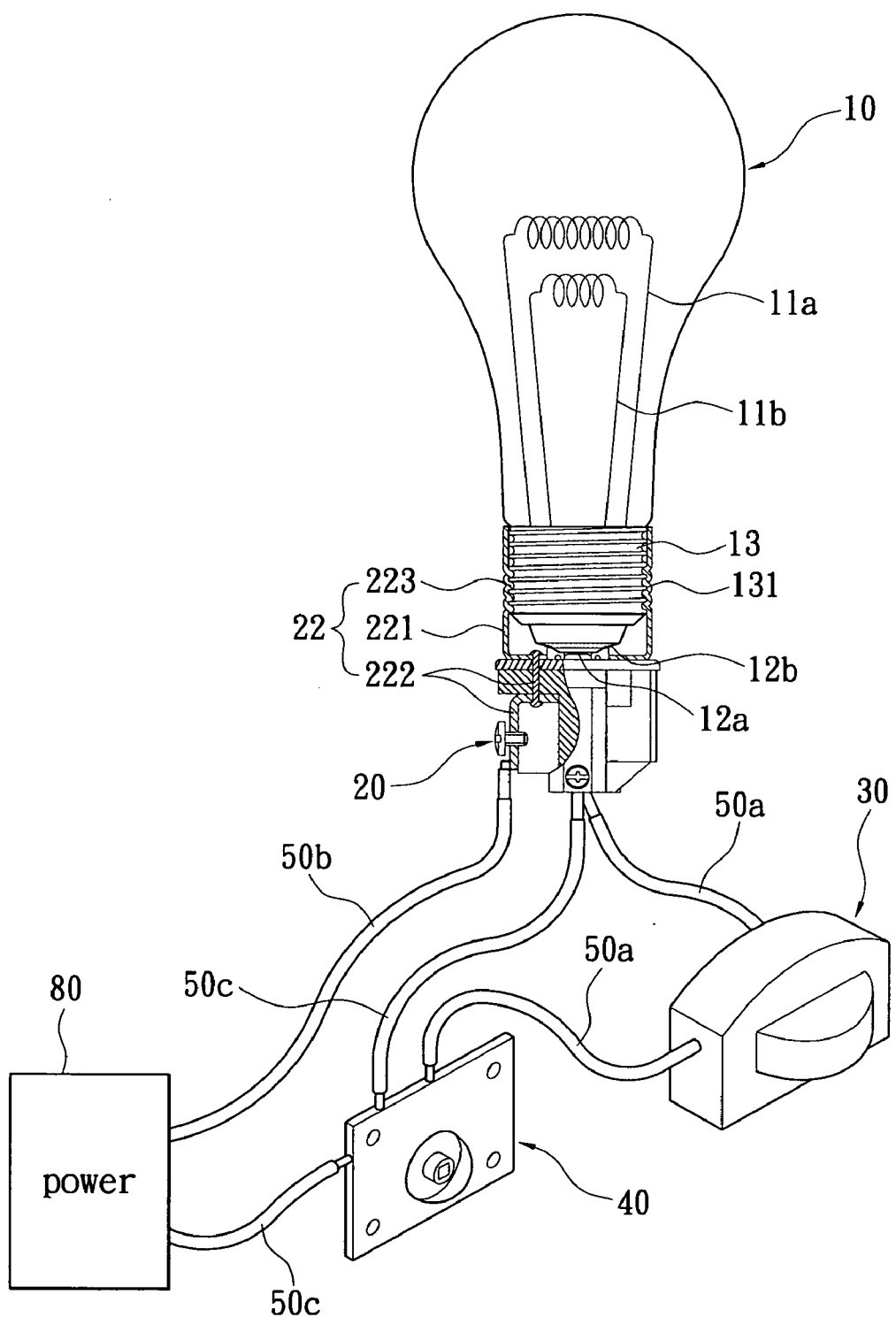
FIG. 2A is an assembly perspective view of the first embodiment of the present invention.

Reference is made to FIGS. 2 and 2A, which show the first embodiment of the present invention. The lighting system includes a lighting unit 10, a base 20, a motion sensor 30, and a photo cell 40. The lighting unit 10 is composed of two light source loads including a first light source load 11a (also referred to as a first light source 11a) and a second light source load 11b (also referred to as a second light source 11b). The lighting unit 10 also has two first electrode portions 12a, 12b, and a second electrode portion 13 that has polarity different from the polarity of the first electrode portions 12a, 12b. In this embodiment, the lighting unit 10 is a tungsten bulb.

The first electrode portions 12a, 12b represent the positive poles, and the second electrode portion 13 represents the negative pole. The first electrode portions 12a, 12b, and the second electrode portion 13 are all made of a metal part with electric conductivity to form the bulb head (also known as screw thread or Edison screw) of a complex bulb. The outer surface of the second electrode portion 13 has an external thread 131.

The positive poles of the first light source 11a and the second light source 11b are respectively and electrically connected with the first electrode portions 12a, 12b, and the negative poles of the first light source 11a and the second light source 11b are respectively and electrically connected with the second electrode portion 13.

The base 20 has two third electrode portions 21a, 21b and a fourth electrode portion 22. The third electrode portions 21a, 21b respectively correspond to the first electrode portions 12a, 12b, and the fourth electrode portion 22 corresponds to the second electrode portion 13. The third electrode portions 21a, 21b are made of a metal part with electric conductivity. The fourth electrode portion 22 is composed of three metal elements, including a metal part 221 which is a concave & hollow surface, a metal connection assembly 222 assembled with the metal part 221, and a thread 223 formed on the inner surface and outer surface of the metal part 221.

The present invention is composed of two electric circuit loops (as shown in FIG. 2 and FIG. 2A). The first electric circuit loop begins from the power supply 80, passes through the photo cell 40 and is electrically coupled in series with the motion sensor 30, then passes through the first conducting cord 50a, the third electrode portion 21a, the first electrode portion 12a, the first light source 11a, the second electrode portion 13, the fourth electrode portion 22, the metal connection assembly 222, the second conducting cord 50b, and finally returns back to the negative pole of the power supply 80. The second electric circuit loop begins from the power supply 80, passes through the photo cell 40, the third electrode portion 21b, the first electrode portion 12b, the second light source 11b, the second electrode portion 13, the fourth electrode portion 22, the metal connection assembly 222, the second conducting cord 50b, and finally returns back to the negative pole of the power supply 80.

The lighting unit 10 is assembled with the base 20 by screwing the outer thread 131 of the lighting unit 10 with the thread 223 of the base 20. By reversing the same procedure the lighting unit 10 can be detached from the base 20.

In the present invention the photo cell 40 controls the power supply 80 to be turned on or turned off. The photo cell 40 detects the brightness of the environment to determine turning on or turning off power supply 80. In daytime the first light source circuit loop and the second light source circuit loop are both cut off because the power supply 80 is turned off by the photo cell 40. In nighttime the photo cell activates the power supply 80. At this time the circuit loop of the second light source 11b becomes conducted, the second light source is automatically turned on, and the motion sensor 30 enters the stand by mode. When some person(s) or some animal(s) enters the detection area of the motion sensor 30, the motion sensor 30 conducts the circuit loop of the first light source 11a. Thereby the first light source is automatically turned on and the lighting unit 10 becomes fully lighted with both light sources turned on. When the person(s) or the animal(s) leaves the detection area, the motion sensor 30 cuts off the circuit loop of the first light source 11a within a short period of time and re-enters the stand by mode. At this time only the second light source remains illuminating till dawn time.

Figure 2B:
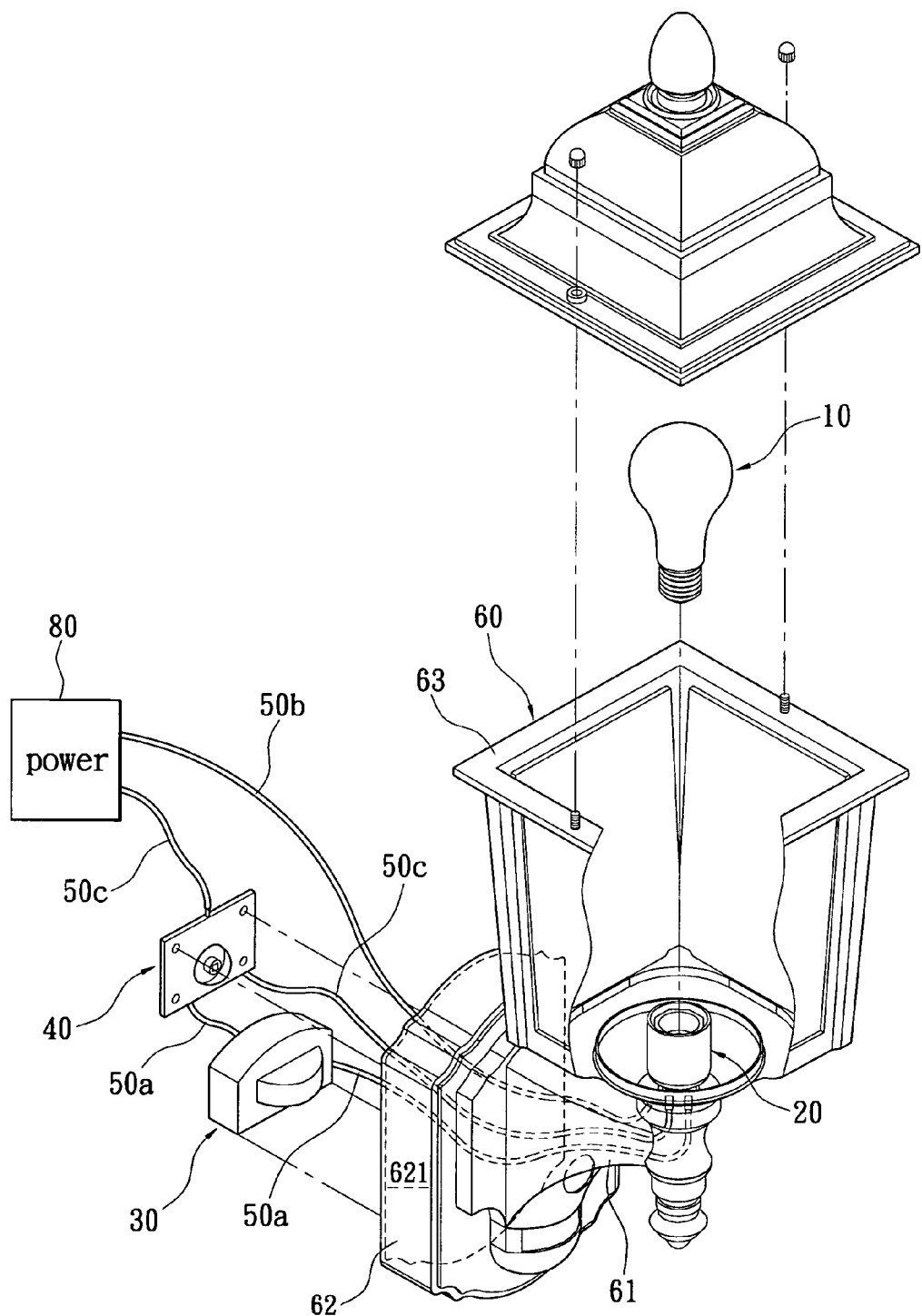
FIG. 2B is a perspective view of the first embodiment of the present invention combined with a lamp structure.
Figure 3:
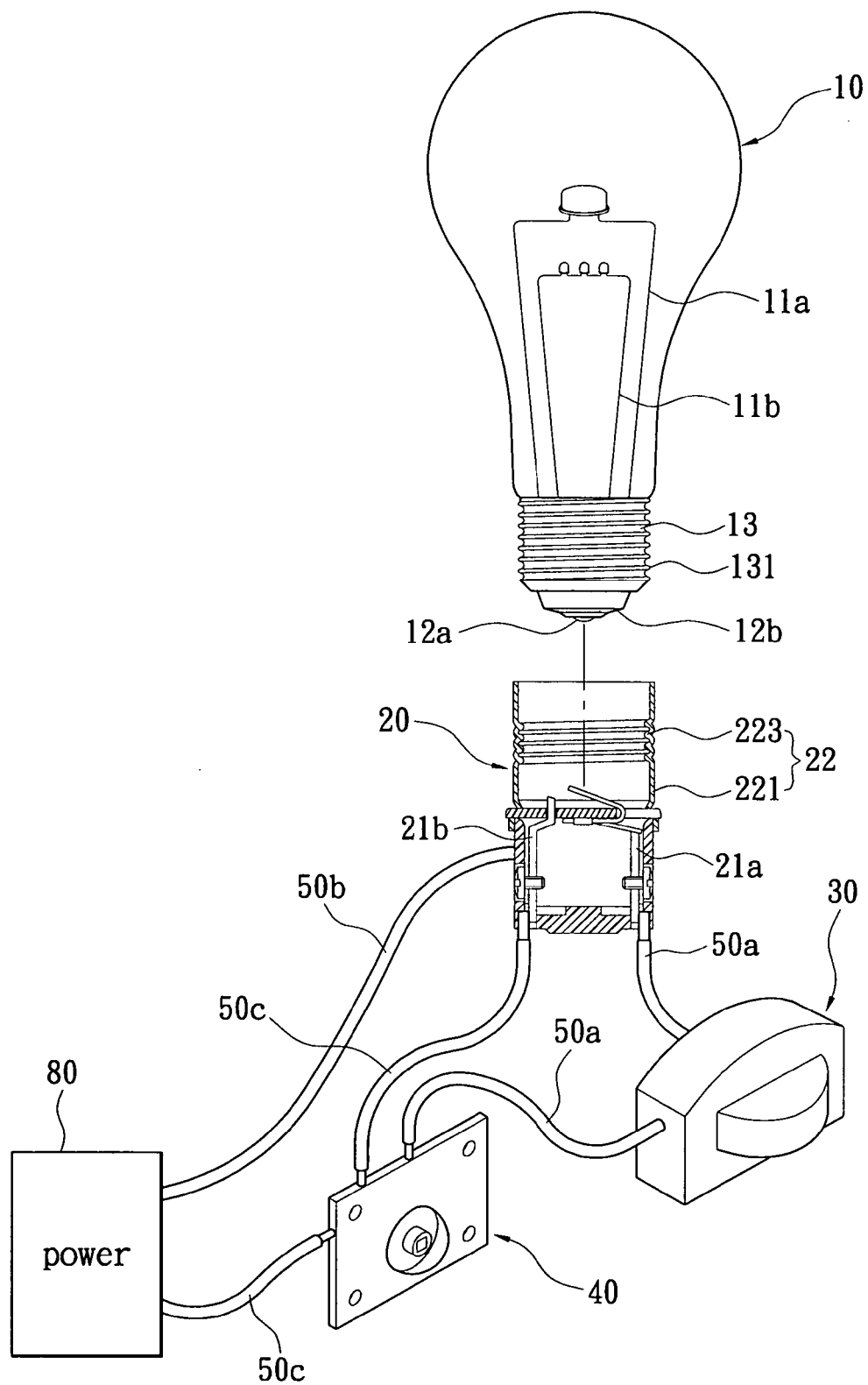
FIG. 3 is a schematic diagram of the second embodiment of the present invention.
Figure 4:
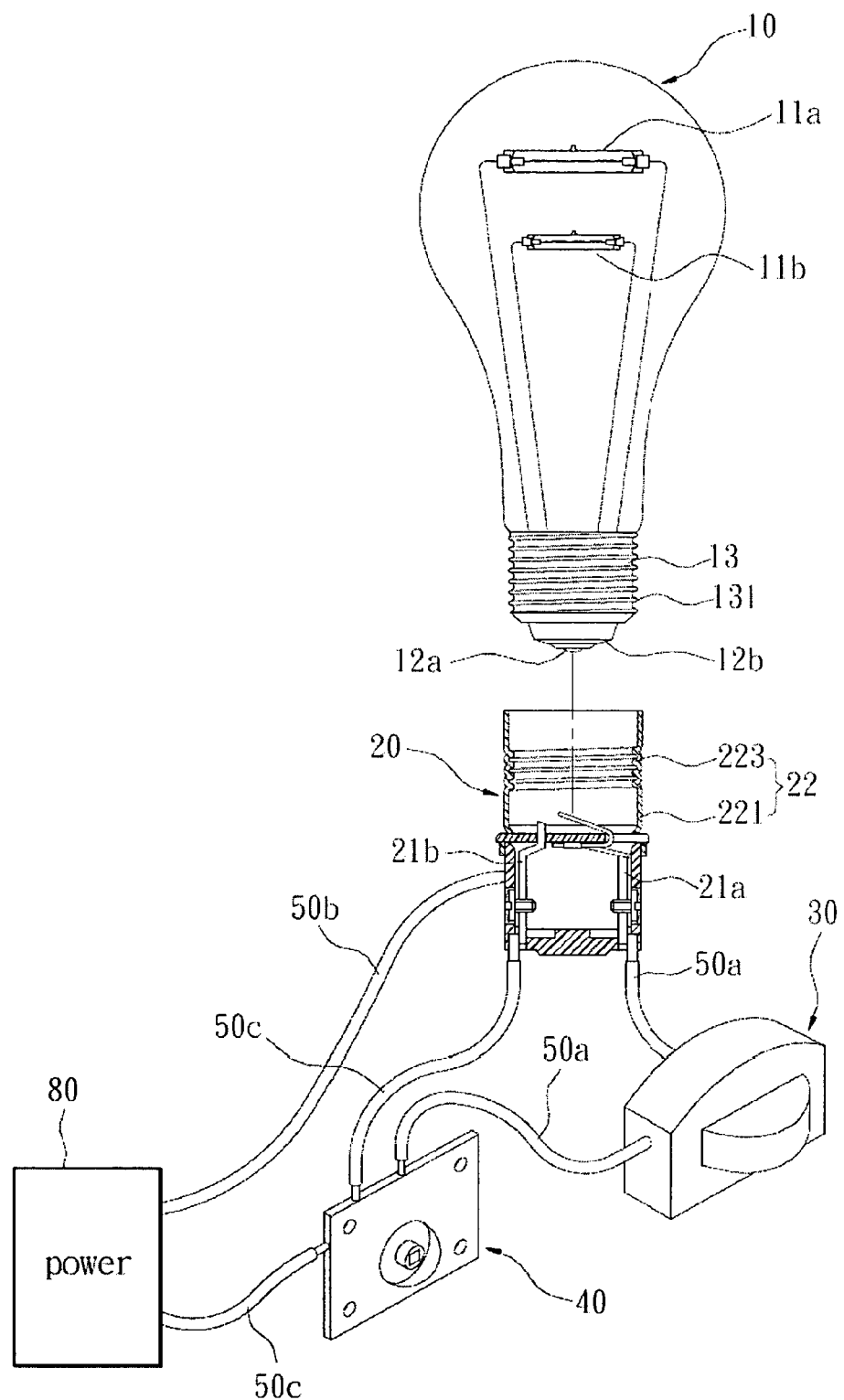
FIG. 4 is the first schematic diagram of the third embodiment of the present invention using an Edison screw construction.
Figure 4A:
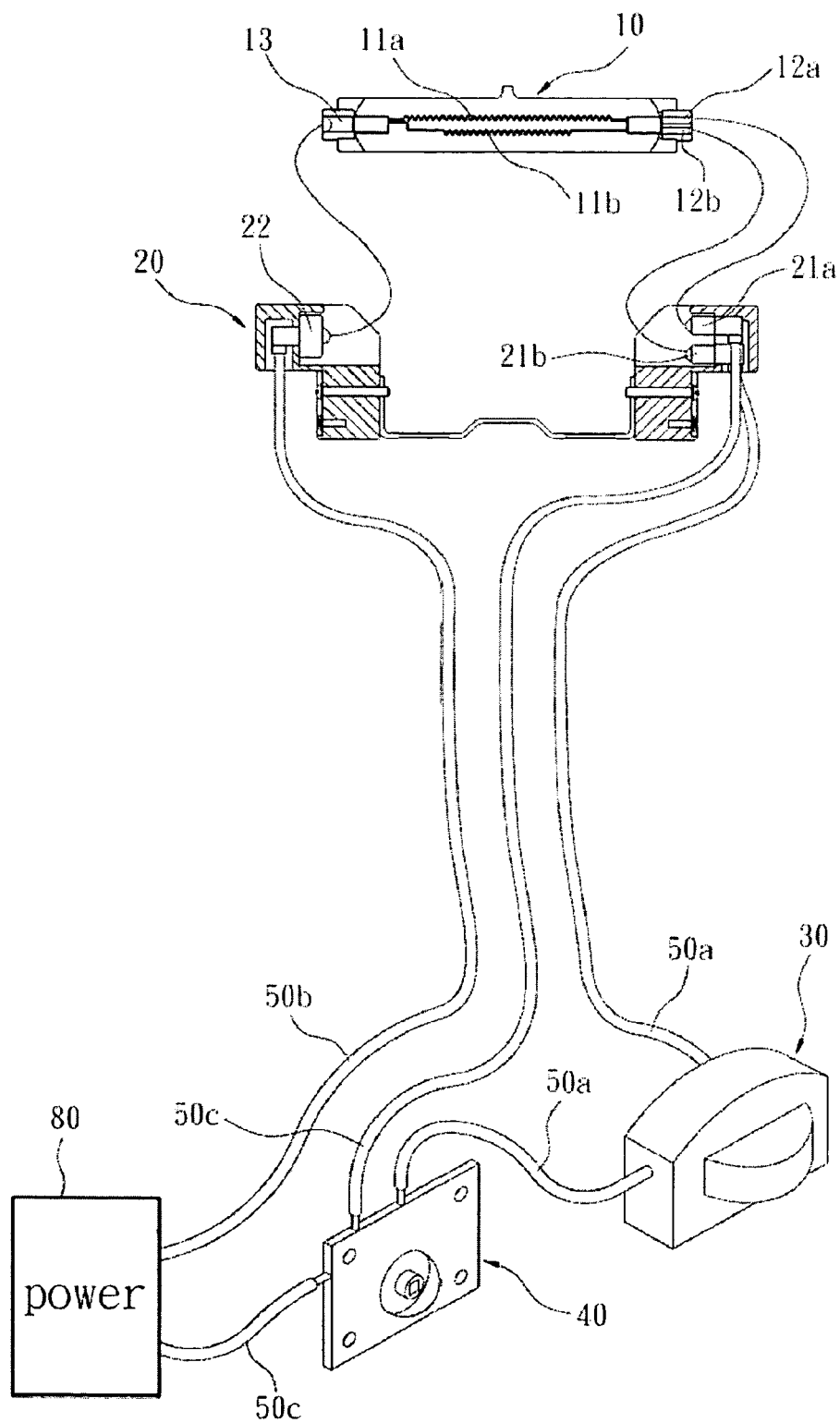
FIG. 4A is the second schematic diagram of the third embodiment of the present invention using a plug in construction.
Figure 5:
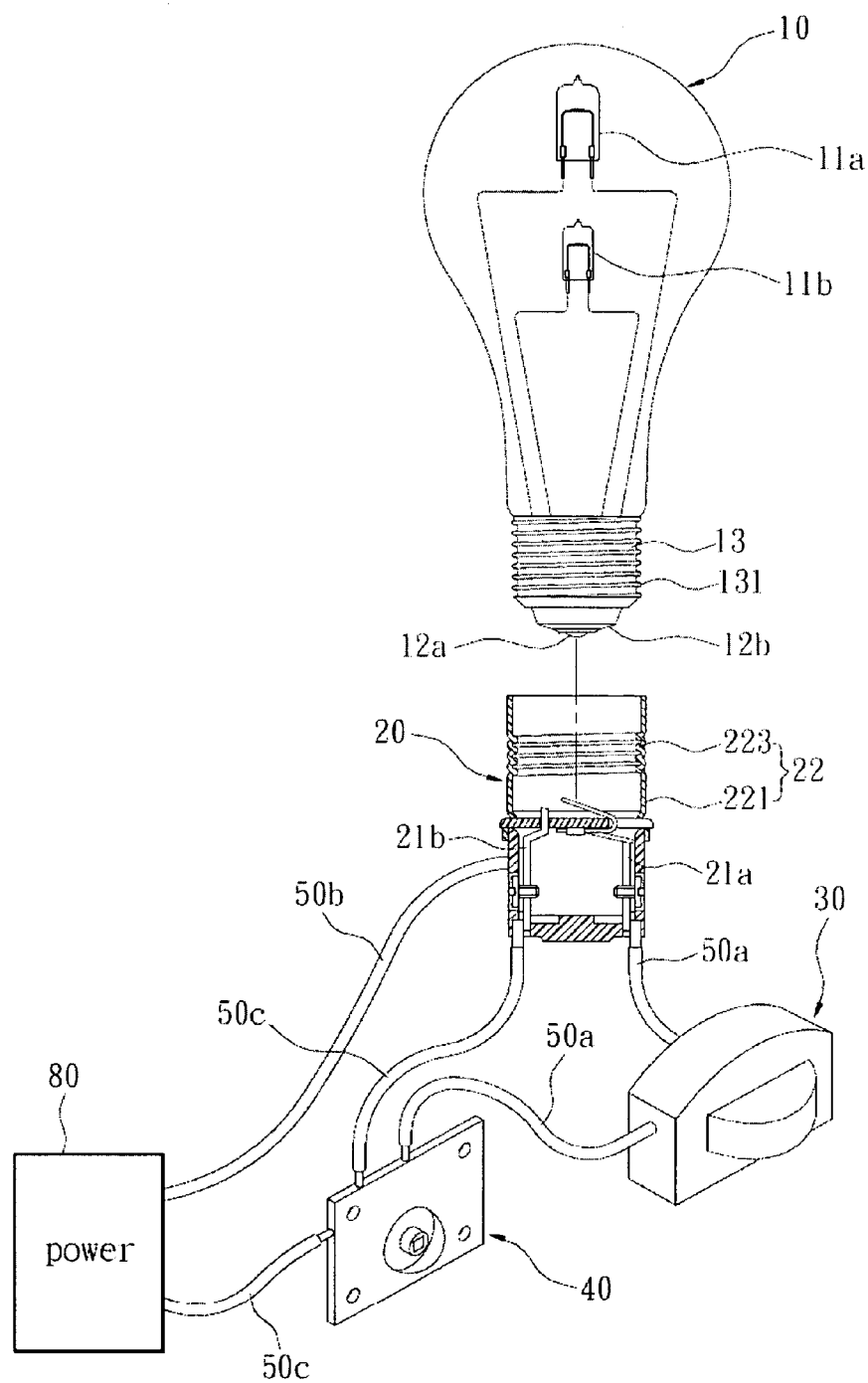
FIG. 5 is the first schematic diagram of the fourth embodiment of the present invention using an Edison screw construction.
Figure 5A:
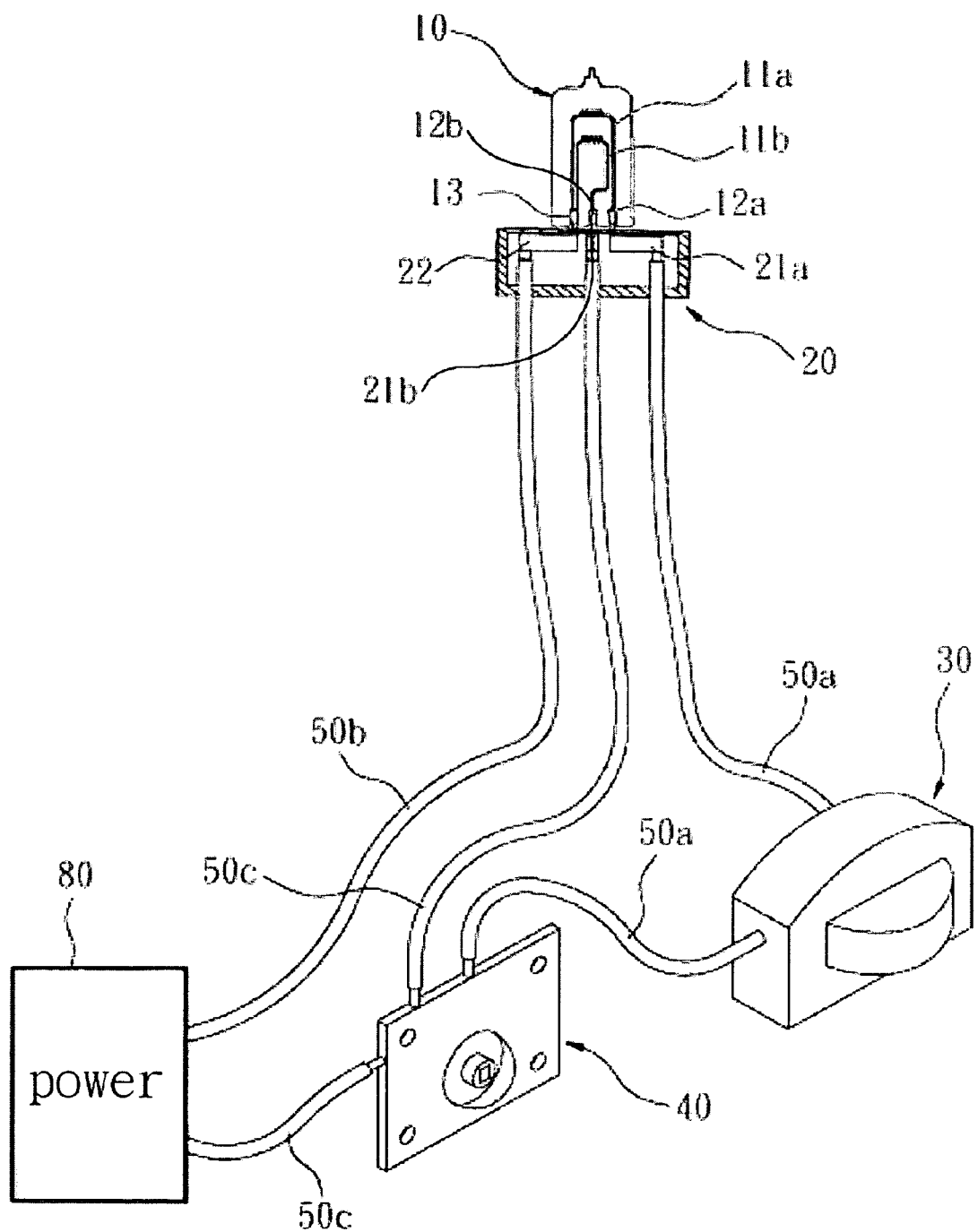
FIG. 5A is the second schematic diagram of the fourth embodiment of the present invention using a plug in construction.

As shown in FIG. 2B, and referring to FIGS. 2 and 2A, the lighting unit 10. The base 20, the motion sensor 30 and the photo cell 40 can be located in a lamp base structure 60 which includes a fastening frame 61, a fastening base 62, and a lamp frame 63. The fastening frame 61 is connected with the surface of the fastening base 62, and the base 20 is located on the fastening frame 61. The lamp frame 63 is assembled on the fastening 61 for covering the base 20 and the lighting unit 10. One surface of the fastening base 62 has a receiving space 621 for receiving the motion sensor 30 and the photo cell 40. The detection portions of the motion 30 and the photo cell 40 are exposed to the outside of the surface of the fastening base 62. The first conducting cord 50a, the second conducting cord 50b, and the third conducting cord 50c are located in the fastening frame 61 and the fastening base 62.

The lamp base structure 60 can be provided for a proper location, such as an outdoor wall. When the switch 70 (FIG. 1) is turned on, and when the environment becomes dark enough, the photo cell 40 activates the power supply 80 and lights the second light source 11b of the lighting unit 10; wherein the second light source 11b is a light source with low illumination serving as an indication light for user positioned at a far distance away. When the motion sensor 30 detects that some person or animal entering the detection area, the first light source 11a with high illumination is automatically lighted to provide much brighter light for user positioned within the detection area. Moreover, the type of the lamp base structure 60 is not limited to any specific style. It can be designed according to the requirements, and can be located indoor or outdoor. The type shown in the figure is simply one embodiment of the present invention, and is not used for limiting the type of the lamp structure 60. The motion sensor 30 is composed of a PIR lens 301 and a control circuit box 302 (not shown). The PIR lens 301 can be integrated with the control circuit box 302 to be positioned at same receiving space 621 or they can be separately positioned at different receiving spaces as needed.

Reference is made to FIGS. 3, 4 and 4A, 5 and 5A which respectively shows the second, the third, and the fourth embodiments of the present invention. In the second embodiment (FIG. 3), the lighting unit 10 is a complex LED bulb which is composed of a first light source 11a with at least one high wattage LED bulb and a second light source 11b with at least one low wattage LED bulb. In the third embodiment (FIG. 4 and FIG. 4A), the lighting unit 10 is a complex halogen bulb which is composed of a first light source 11a with a high wattage tungsten & halogen load and a second light source 11b with a low wattage tungsten & halogen load. In the fourth embodiment of the present invention (FIG. 5 and FIG. 5A), the lighting unit 10 is a complex xenon bulb which includes a first light source 11a with a high wattage tungsten & xenon load and a second light source 11b with a low wattage tungsten & xenon load. Except that the load materials of the lighting units 10 are different, all the above three embodiments have the same characteristic of two circuit loop structure. The first circuit loop always begins from the power supply 80, passes through the photo cell 40 and is electrically coupled in series with the motion sensor 30, then passes through the first conducting cord 50a, the third electrode portion 21a, the first electrode portion 12a, the first light source 11a, the second electrode portion 13, the fourth electrode portion 22, the second conducting cord 50b, and finally returns back to the negative pole of the power supply 80 to form a full circuit loop. The second circuit loop begins from the power supply 80, passes through the photo cell 40, the third conducting cord 50c, the third electrode portion 21b, the first electrode portion 12b, the second light source 11b, the third electrode portion 13, the fourth electrode portion 22, the second conducting cord 50b, and finally returns back to the negative pole of the power supply 80 to form another full circuit loop.

The function and operation of such two circuit loops are the principle and claim basis of the present invention, which are the same as those of the first embodiment shown in FIGS. 2 and 2A, and no need to repeat herein due to redundancy.

Figure 6:
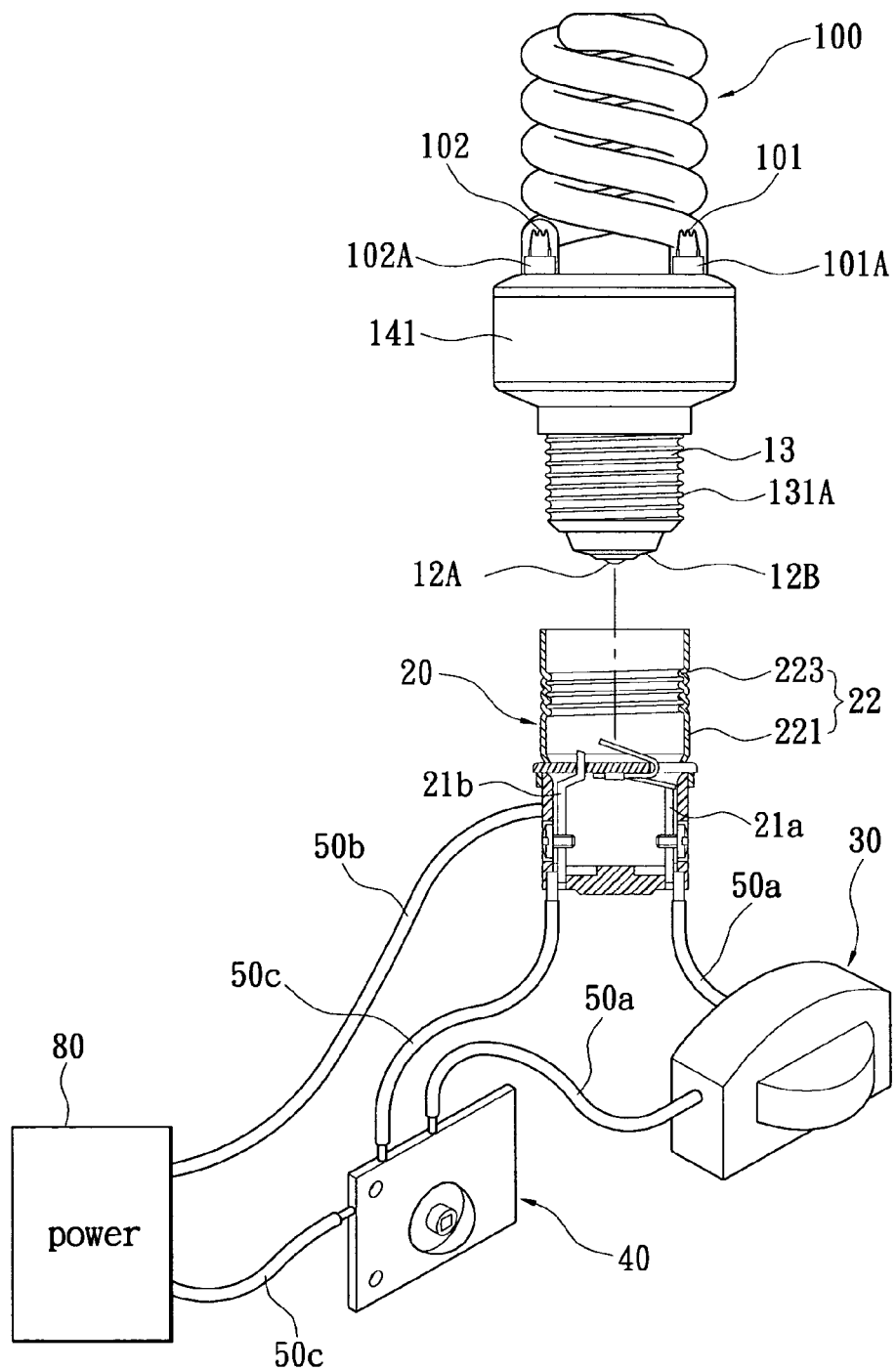
FIG. 6 is a schematic diagram of the fifth embodiment of the present invention.

Reference is made to FIG. 6, which shows the fifth embodiment of the present invention. In this embodiment, the lighting unit 100 is an energy saving complex fluorescent bulb with two light source loads; the first light source 101A (corresponding to 11a in the previous embodiments), the second light source 102A (corresponding to 11b in the previous embodiments), two first electrode portions 12A and 12B (corresponding to 12a and 12b in the previous embodiments), and a second electrode portion 13 having an external thread 131A (corresponding to 131 in the previous embodiments). Except that the illumination principles of fluorescent bulb are different from those of the previous embodiments, the function and performance concept of this embodiment in the present invention is not different from the previous embodiments. In day time, the first light source 101A and the second light source 102A are controlled by the photo cell 40 and are turned off via the deactivation of the power supply 80. When night time comes, the photo cell 40 activates the power supply 80 to conduct the circuit loop of the second light source 102A and the second light source 102A is automatically turned on. At such time, the motion sensor 30 which is electrically connected with the first source 101A enters the stand by mode. When someone or an animal enters the detection area, the motion sensor 30 conducts the circuit loop of the first light source 101A and the first light source is thereby turned on. At such time the lighting unit 100 is fully lighted with both light sources turned on. When the person or the animal leaves the detection area, the motion sensor 30 cuts off the circuit loop of the first light source 101A within a short period of time and re-enters the stand by mode. At such time, only the second light source 102A remains illuminating till dawn time.

The energy saving fluorescent bulb is composed of three portions. The upper portion is a fluorescent bulb (a spiral type or an U type), the middle portion is a ballast unit 141, and the lower portion is the same structure as the previous embodiments including a second electrode portion 13A, an external thread 131A and two first electrode portions 12A, 12B that can be assembled and disassembled with the base 20.

The lighting principle and the engineering construction of the energy saving fluorescent bulb is outside of the scope of the present invention since they are existing technologies. However a brief description is provided as follow for illustration purpose;

The fluorescent bulb 100 has two tungsten electrodes. One tungsten electrode is a low voltage tungsten electrode 102, and the other is a high voltage tungsten electrode 101. When the power supply 80 is turned on, the voltage of power supply 80 passes through the ballast 141 to generate an ultra high frequency voltage to be exerted on the two poles of the tungsten electrodes. When the temperature of the tungsten electrodes is heated up to 1160 degrees C., the tungsten electrodes start to emit electrons to generate plasma effect and emit UV rays to excite the fluorescent powder coated on the inner surface of the fluorescent bulb thereby to produce the fluorescent light.

According to the above principles, when the circuit loop of the low voltage tungsten electrode 102 is conducted by the photocell 40, the second light source 102A is turned on to emit low illumination light. When the circuit loop of the high voltage tungsten is conducted by the motion sensor 30, the first light source 101A is turned on to emit high illumination light. At such time, the brightness of the lighting unit 100 is the combined illumination of both the second light source 102A and the first light source 101A.

Figure 7:
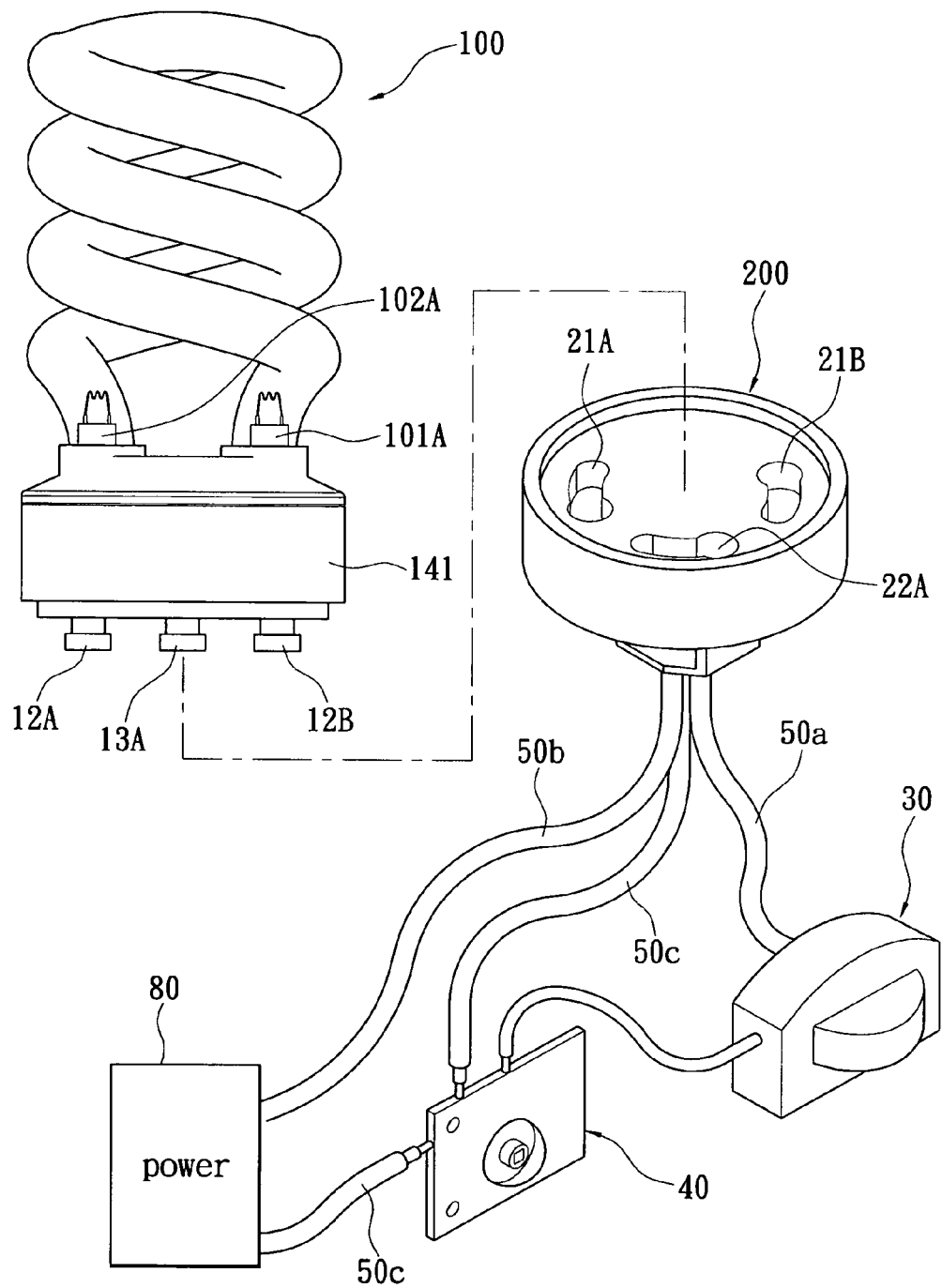
FIG. 7 is a schematic diagram of the sixth embodiment of the present invention.

Reference is made to FIG. 7, which shows the sixth embodiment of the present invention. The energy saving fluorescent bulb 100 in the fifth embodiment is assembled with the base 20 through a screw thread construction. In this embodiment, the energy saving fluorescent bulb 100 is assembled with the base 200 through a plug& twist lock construction. The first electrode portions 12A, 12B and the second electrode portion 13A of the lighting unit 100 are the male sides of such plug & twist lock construction. The third electrode portions 21A, 21B and the fourth electrode portion 22A of the base 200 are the female sides of the plug & twist lock construction. The lighting unit 100 is assembled with the base 200 by plugging the male side electrodes 12A, 12B and 13A into the female side electrodes 21A, 21B and 22A, and then twist lock the lighting unit 100 and the base 200. The process is reversible in order to separate the lighting unit 100 from the base 200.

Figure 8:
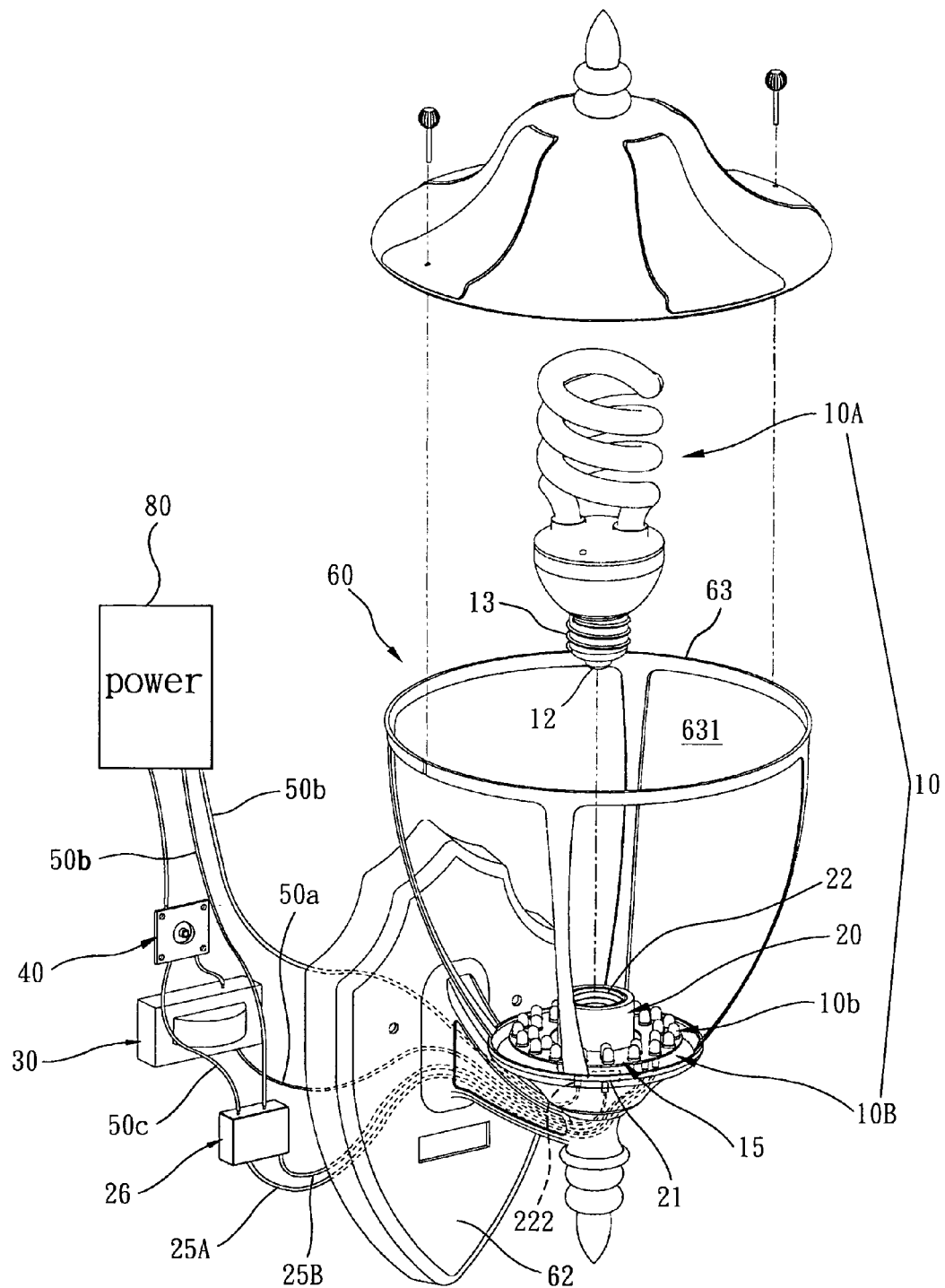
FIG. 8 is a schematic diagram of the seventh embodiment of the present invention.

Reference is made to FIG. 8, which shows the seventh embodiment of the present invention. The lighting unit 10 is composed of two light source loads made of different materials. The first light source 10A is an energy saving fluorescent bulb, or a tungsten bulb, or a xenon bulb. The second light source 10B is a light source load composed of a plurality of LED bulb 10b. The bulb 10A is assembled with the base 20 via a screw construction. The bulb 10A in this embodiment is different from the bulbs used in the previous embodiment. The bulb 10A is a single load light source. Therefore it does not include the two electrode portions and the two third electrode portions (for example, no third electrode portions 21a nor 21b of previous embodiments). The bulb 10A merely has a first electrode portion 12 (12a and 12b are merged), and a third electrode portion 21 (21a and 21b are merged). The second light source 10B is composed of a plurality of LED bulbs 10b that are located on a ring shaped LED base 15 surrounding the base 20. The positive poles and the negative poles of all LED bulbs 10b are respectively and electrically connected via the LED base 15 to form a positive pole terminal 25A and a negative pole terminal 25B. The positive pole terminal 25A of the second light source 10B is electrically connected with a driving unit 26, and then is electrically coupled in series with the photocell 40.

The two circuit loops in the seventh embodiment is described as following;

The first electric circuit loop begins from the power supply 80, passes through the photocell 40 and is electrically connected in series with the motion sensor 30, then passes through the first conducting cord 50a, the third electrode portion 21, the first electrode portion 12, the bulb load 10A, the second electrode portion 13, the fourth electrode portion 22, the metal connection part 222, the second conducting cord 50b, and finally returns back to the negative pole of the power supply 80 to form a full circuit loop.

The second circuit loop begins from the power supply 80, passes through the photo cell 40, the third conducting cord 50c, the driving unit 26, the positive pole terminal 25A of the LED base 15, the LED bulb set 10B, the negative pole terminal 25B of the LED base 15, the driving unit 26, second conducting cord 50b, and then returns back to the negative pole of the power supply 80 to form another full circuit loop.

When night time comes, the photocell 40 activates the power supply 80 to conduct the circuit loop of the second light source 10B and to turn on the second light source 10B for emitting low level illumination, Meanwhile the motion sensor of the first light source 10A enters the stand by mode. When a person or an animal enters the detection area, the motion sensor 30 conducts the circuit loop of the first light source 10A; the first light source is consequently turned on for high illumination. When the person or the animal leaves the detection area, the motion sensor 30 cuts off the circuit loop of the first source 10A within a short period of time and then re-enter the stand by mode. The second light source continues illuminating till dawn. Because the LED bulb consumes very little power (less than 2 watts), the energy saving effect of the seventh embodiment is greater than the previous embodiments.

Figure 9:
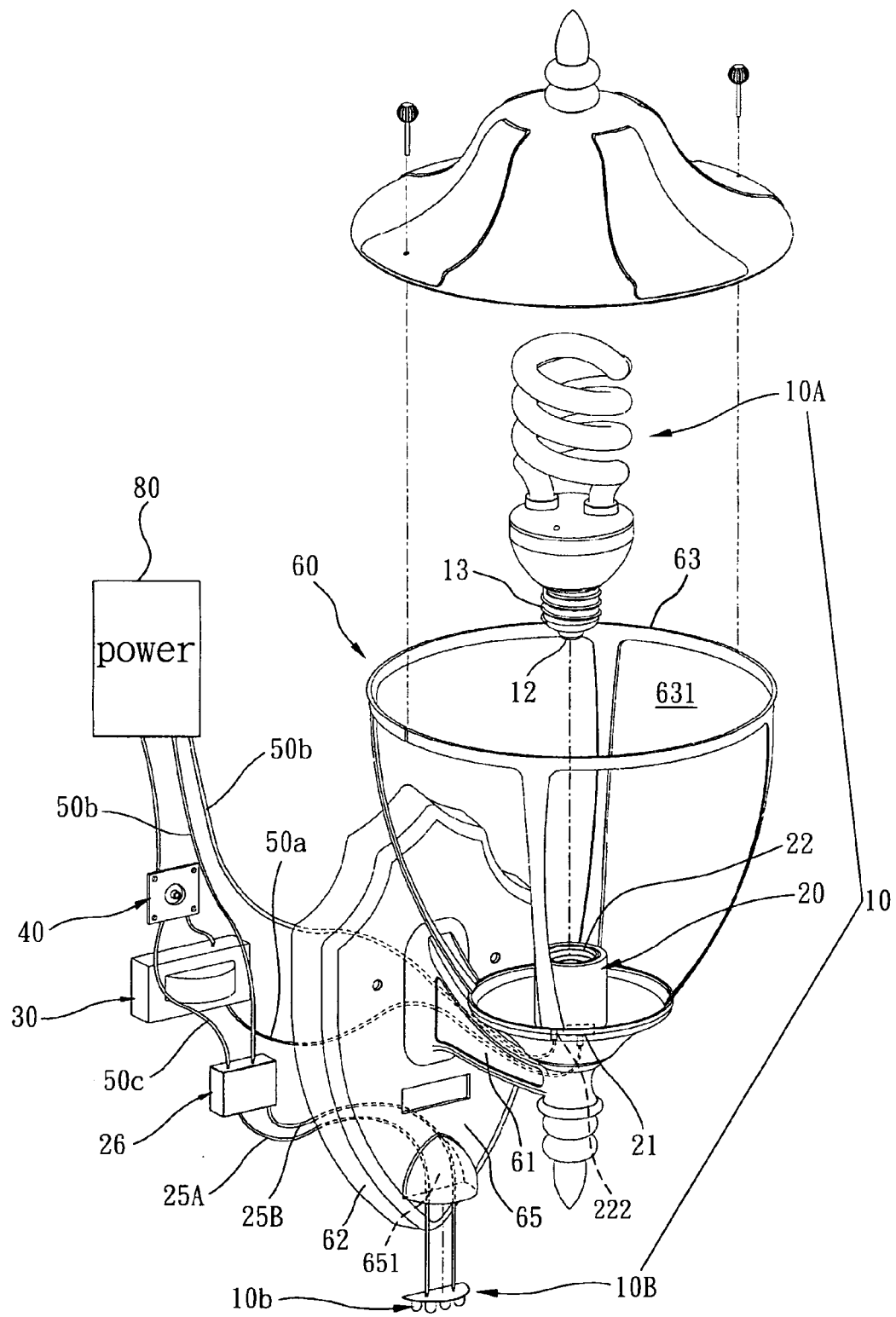
FIG. 9 is a schematic diagram of the eighth embodiment of the present invention.

Reference is made to FIG. 9, which shows the eighth embodiment of the present invention. The lighting unit 10 of the eighth embodiment is the same as that of the seventh embodiment (FIG. 8). The difference between the two embodiments is that for the eighth embodiment the first light source 10A and the second light source 10B are located in different receiving spaces 631, 651 respectively. The eighth embodiment illustrate that the two light sources, 10A and 10B do not need to emit their light in the same direction. The first light source 10A is the same as the seventh embodiment. The bulb 10A is assembled with the base 20 via a screw thread construction. The second light source LED bulb 10B is installed in a metal mask shell 65 combined with the fastening base 62 so that the light source emits light downwards (or upwards, as customization request). The circuit loop of the first light source and the circuit loop of the second light source are the same as those in the seventh embodiment. The characteristic of the eighth embodiment is that the LED bulb 10B is hidden in the metal mask shell 65 to emit light downwards or upwards. Because the bulb is not exposed to the outside, it has the dark sky illumination effect as requested by consumers or government regulations.

When the night time comes, the photon cell 40 activates the power supply 80 to conduct the circuit loop of the second light source 10B and the second light source 10B automatically emits light downwards or upwards to provide the dark sky illumination effect. At this time, the motion sensor 30 enters the stand by mode. When a person or an animal enters the detection area, the motion sensor 30 conducts the circuit loop of the first light source 10A, thereby the first light source 10A is automatically turned on to illuminate together with the second light source 10B. When the person or the animal leaves the detection area of the motion sensor 30, the motion sensor cuts off the circuit loop of the first light source 10A within a short period of time and enters the stand by mode again. At this time only the second light source 10B remains illuminating to save energy.

Aside from using the motion sensor 30 to operate the performance of the first light source 11a, the present invention also offers a manual override control to turn on the first light source. Such manual override control circuit is composed of a microprocessor and a relay circuit. By instantly and continuously performing the ON-OFF-ON motion of the power switch 70, such manual override control circuit can separate the first light source load 11a from the motion sensor 30 and connect the first light source load 11a to the power supply 80 through the photocell 40. The first light source 11a thereby illuminates together with the second light source 11b to provide the brightest illumination. When daybreak time comes, the photocell 40 turns off the power supply 80, the control circuit generates an electrical signal to cause the relay lose electromagnetic function, thereby the first light source load 11a resumes its electrical connection with the motion sensor 30.

Figure 10:
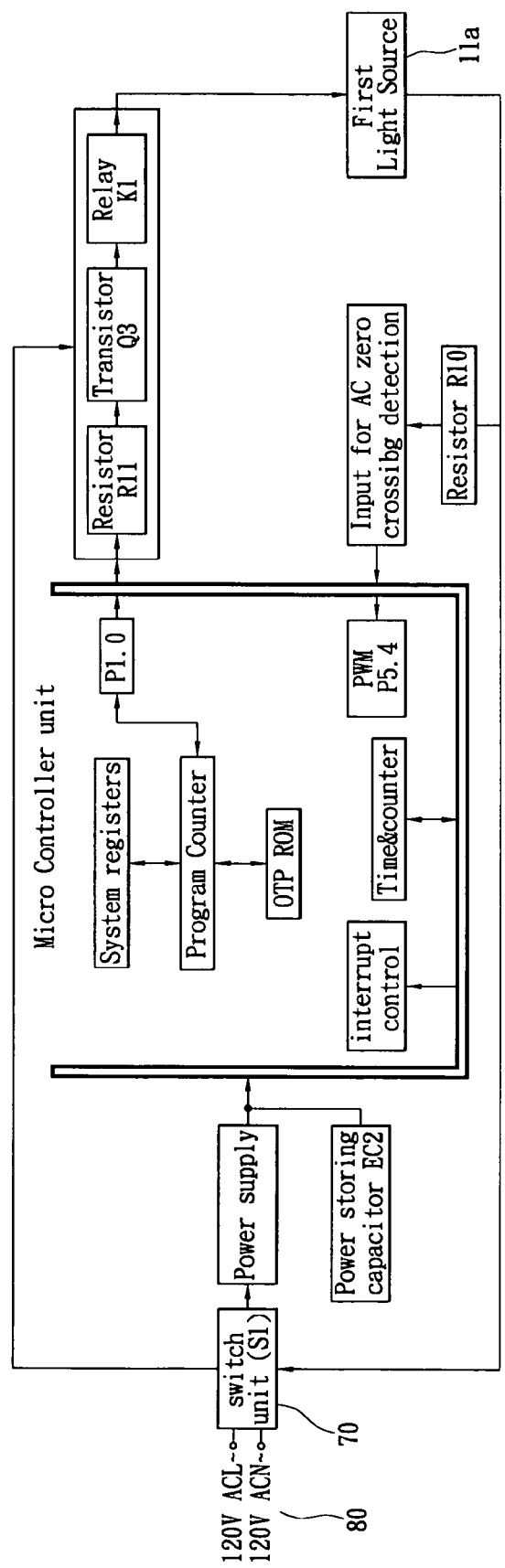
FIG. 10 is a block diagram of the manual override control unit of the present invention, in which a MCU is employed.
Figure 11:
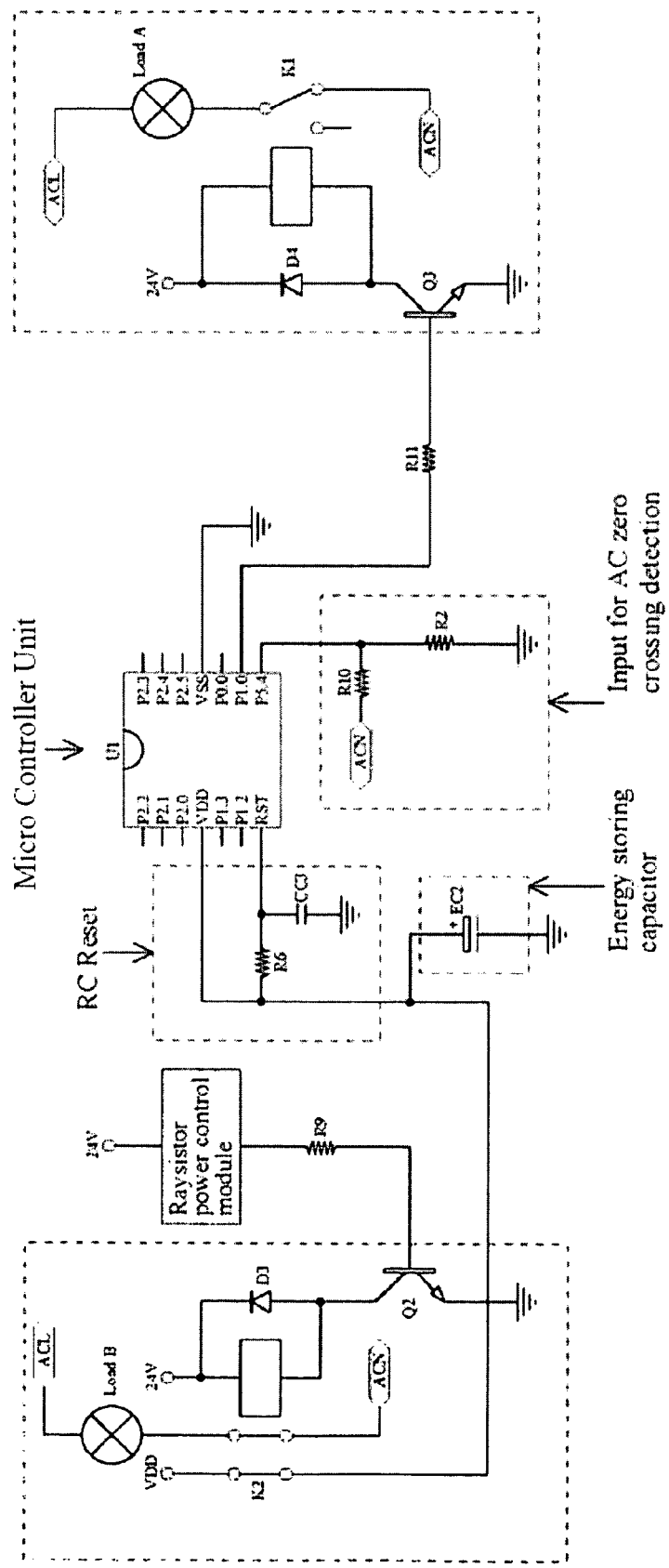
FIG. 11 is a circuit diagram of the manual override control unit of the present invention.

Reference is made to FIG. 10 and FIG. 11, which illustrate the operational principle of the manual override circuit; Because both ACN (Alternating Current Neutral) and ACL (Alternating Current Live) are controlled by the switch S1, power of the zero-cross pulse detection input portion ACN is cut off when the power switch S1 is turned off. No current flows through the resistor R10. The pulse width detection control pin P5.4 of MCU (Micro Controller Unit) fails to detect the pulse signal that has the same frequency as the power. With the discharge of electrolytic capacitor EC2 serving as energy storing circuit when the power switch S1 is turned off, the MCU is able to continue its execution of program orderly. The Program Counter in the MCU scans the voltage levels of the input/output pins and the operation status of various pins are therefore stored in the system status register in the MCU. When no pulse is inputted to the pulse width detection control pin P5.4, the counter is reset to count time again. 3 seconds is the interruption control period which is subject to engineering design as required. If the power supply is resumed within 3 seconds (the pulse width detection control pin P5.4 detects that a pulse signal having the same frequency as the power supply inputted), the numerical data in the system status register is changed by the Program Counter. The Program Counter in the MCU consequently uses the program stored in the OTP ROM (One Time Programmable ROM) to interrupt the other input/output pins and controls Pin P1.0 to output a high level voltage. Such high level voltage then controls the transistor Q3 to be conducted and saturated via the resister R11. The relay K1 is consequently activated electromagnetically. The first light source load a (11a) is connected and locked electrically with the power supply 80. At this time both the first light source and the second light source are lighted and the lighting unit produces the brightest illumination. When daybreak comes, the photocell circuit 40 deactivates the power supply 80, relay K2 is released to turn off the second light source load B (11b). After the relay K2 is released, the power supply of the MCU is forcedly cut off, Pin P1.0 consequently stops outputting a high level voltage, no current flows through the resistor R11, the transistor Q3 thereby loses its driving voltage and consequently relay K1 is released to turn off the first light source 11a, the first light source load resumes its electrical connection with the motion sensor 30 or in the absence of a motion sensor 30 resumes its open position wherein the lighting system becomes a two level lighting system with manual override control.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A two way lighting control system with dual illumination sources, comprising:

a complex lighting unit having a first light source load, a second light source load, two first electrode portions, and a second electrode portion that has polarity different from the polarity of the first electrode portions, wherein the two first electrode portions are respectively and electrically connected with one end of the first light source load and the second light source load, and the second electrode portion is electrically connected with the other end of the first light source load and the second light source load;

a base, wherein the complex lighting unit is detachably assembled with such base, the base has two third electrode portions that are respectively and electrically connected with such first electrode portions of such complex lighting unit, and a fourth electrode portion electrically connected with such second electrode portion;

a motion sensor electrically connected with a third electrode portion of such base, and a first electrode portion of such complex lighting unit to electrically turn on or turn off such first light source of such complex lighting unit; and a photocell electrically connected with such second light source load and electrically coupled in series with such first light source load via such motion sensor.

2. The two way lighting control system with dual illumination sources as claimed in claim 1, further comprising a manual override control unit, wherein by instantly and continuously turning the power switch to perform a ON-OFF-ON motion, such first light source load can be electrically detached from such motion sensor and connect electrically to such photocell and power source to illuminate together with such second light source load during night time; At dawn, such manual override control unit resets such first light source load to resume electrical connection with such motion sensor.

3. A two way lighting control system with dual illumination sources, comprising:

a complex lighting unit having a first light source load, a second light source load, two first electrode portions, a second electrode portion that has polarity different from the polarity of such first electrode portions, wherein such first electrode portions are respectively and electrically connected with one end of such first light source load and such second light source load, and such second electrode portion is electrically connected with the other end of such first light source load and such second light source load;

a base, wherein such complex lighting unit is detachably assembled with such base, such base has two third electrode portions that are respectively and electrically connected with such first electrode portions, and a fourth electrode portion electrically connected with such second electrode portion;

a photocell electrically connected with such second light source load; and a manual override control unit including a control circuit composed of a microprocessor and a relay circuit, wherein by instantly and continuously turning the power switch to perform a ON-OFF-ON motion, such first light source load can be electrically connected with such photocell and power source to illuminate together with such second light source load during night time; At dawn, such manual override control unit resets such first light source load to an open circuit position (disconnected).

4. A two way lighting control system with two illumination sources, comprising:

two lighting units composed of two light source loads with same construction materials, wherein the first light source load is of high wattage and the second light source load is of low wattage;

two bases, wherein the first base is detachably assembled with such first light source load and is electrically connected with such first light source load, and the second base is detachably assembled with such second light source load and is electrically connected with such second light source load;

a motion sensor electrically connected with such first light source load via such first base to electrically turn on or turn off such first light source; and a photocell electrically connected with such second light source load via such second base and electrically connected with such first light source load via such motion sensor and such first base to form two sets of electrical circuit loops.

5. The two way lighting control system with dual illumination sources as claimed in claim 4, further comprising a manual override control unit, wherein by instantly and continuously turning the power switch to perform a ON-OFF-ON motion, such first light source load can be electrically detached from such motion sensor and connect electrically to such photocell and power source to illuminate together with such second light source load during night time; At dawn, such manual override control unit resets such first light source load to resume electrical connection with such motion sensor.

6. A two way lighting control system with dual illumination sources, comprising:

two lighting units composed of two light source loads with different construction materials, wherein the first light source load is of high wattage and the second light source load is of low wattage, such low wattage second light source load is composed of at least one LED bulb;

a base, wherein such base is detachably assembled with such first light load and is electrically connected with such first light source load;

an LED base used for installing LED bulbs;

a driving unit electrically connected with such LED base in series for driving LED bulbs to emit light;

a motion sensor electrically connected with such first light source load via such base to electrically turn on or turn off such first light source load; and a photocell electrically connected with such second light source load via such driving unit and such LED base to form an electrical circuit loop, and electrically connected with such first light source load via such motion sensor to form another electrical circuit loop.

7. The two way lighting control system with dual illumination sources as claimed in claim 6, further comprising a manual override control unit, wherein by instantly and continuously turning the power switch to perform a ON-OFF-ON motion, such first light source load can be electrically detached from such motion sensor and connect electrically with such photocell and power source to illuminate together with such second light source load during night time; At dawn, such manual override control unit resets such first light source load to resume electrical connection with such motion sensor.

8. A two way lighting control system with dual illumination sources, comprising:

two lighting units composed of two light source loads with different construction materials, wherein the first light source load is of high wattage and the second light source load is of low wattage, such low wattage second light source load is composed of at least one LED bulb;

a base, wherein such base is detachably assembled with such first light source load and is electrically connected with such first light source load;

an LED base used for installing LED bulbs;

a driving unit electrically connected with such LED base in series for driving LED bulbs to emit light;

a photocell electrically connected with such second light source load via such driving unit and such LED base to form an electrical circuit loop;

a manual override control unit including a control circuit composed of a microprocessor and a relay circuit, wherein by instantly and continuously turning the power switch to perform a ON-OFF-On motion, such first light source load can be electrically connected to such photocell and power source to illuminate together with such second light source load during night time; At dawn, such manual override control unit resets such first light source to an open circuit position (disconnected).

* * * * *